(No Model.) 3 Sheets—Sheet 2.
V. WEBER & J. R. HARRISON.
AUTOMATIC GRAIN WEIGHING MACHINE.
No. 359,525. Patented Mar. 15, 1887.
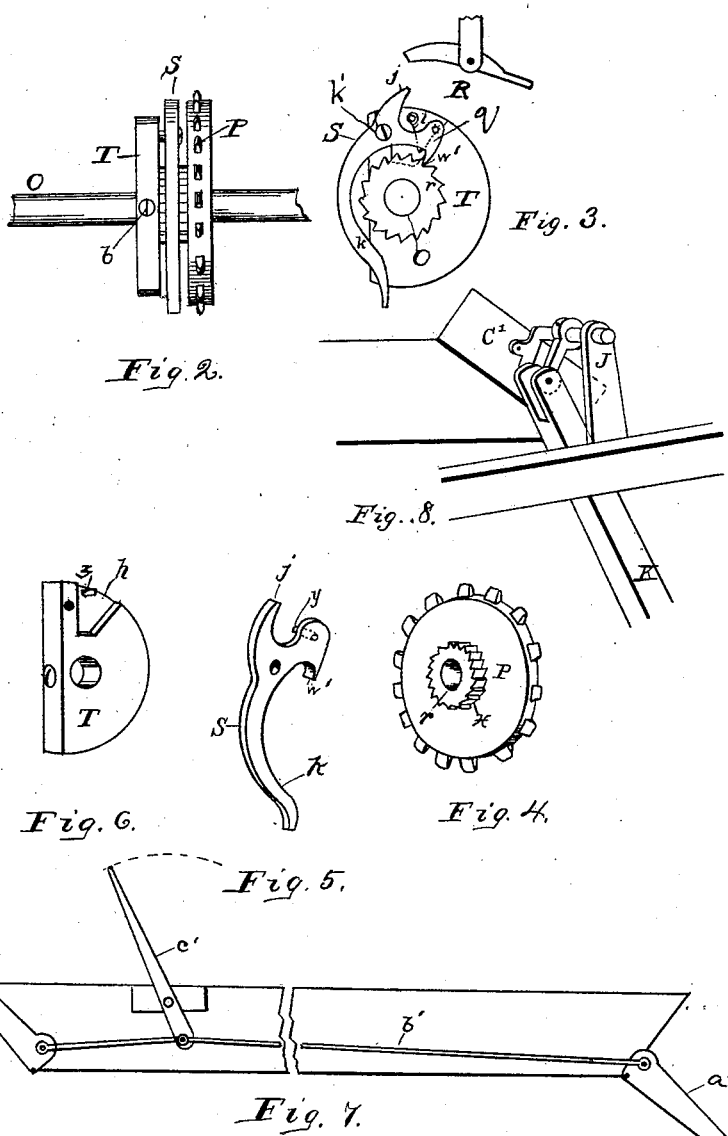

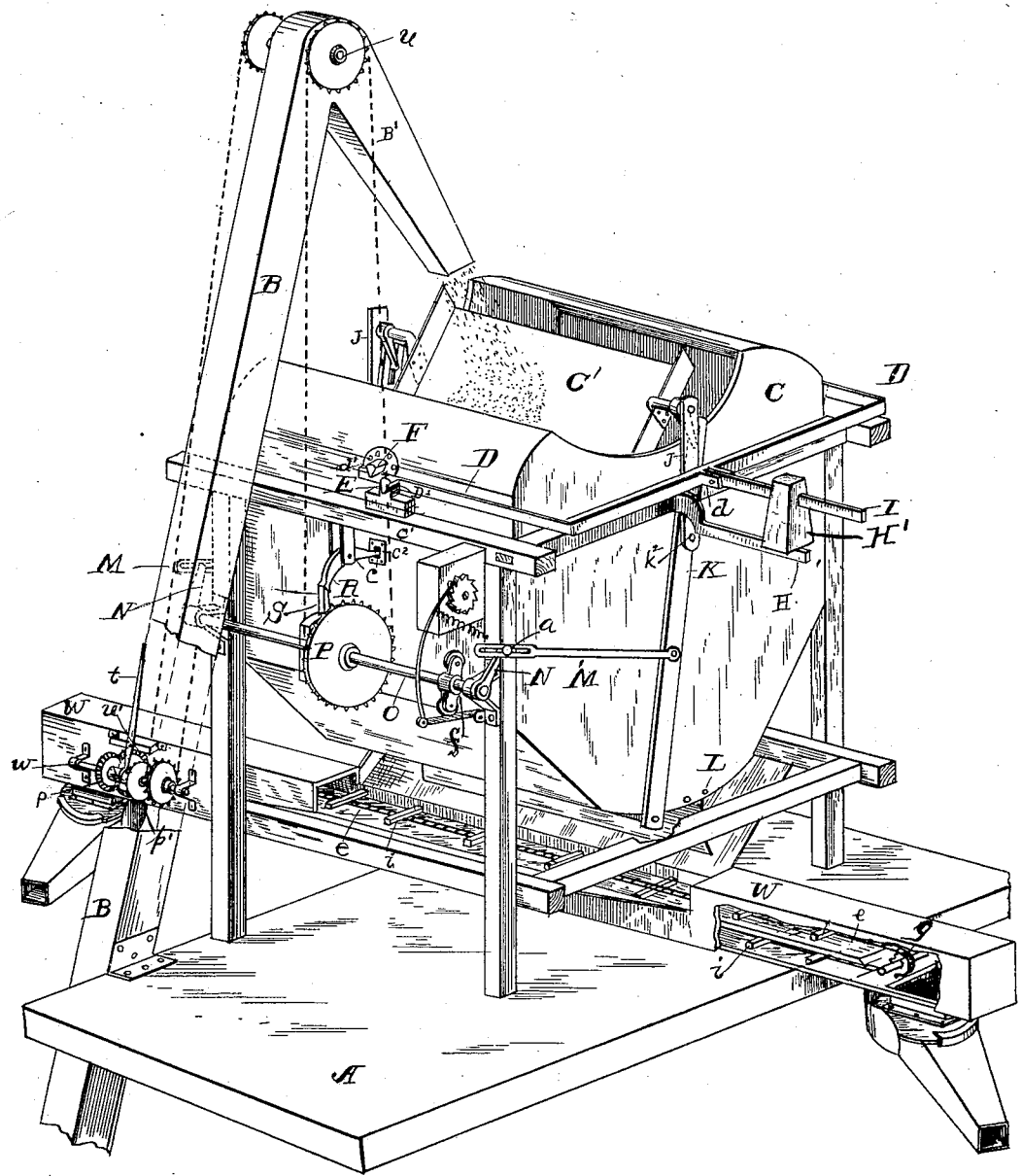

(No Model.) 3 Sheets—Sheet 3.
V. WEBER & J. R. HARRISON.
AUTOMATIC GRAIN WEIGHING MACHINE.
No. 359,525. Patented Mar. 15, 1887.
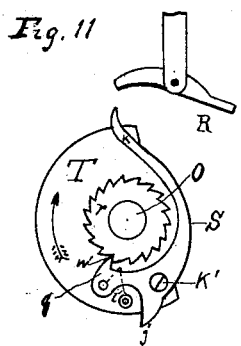
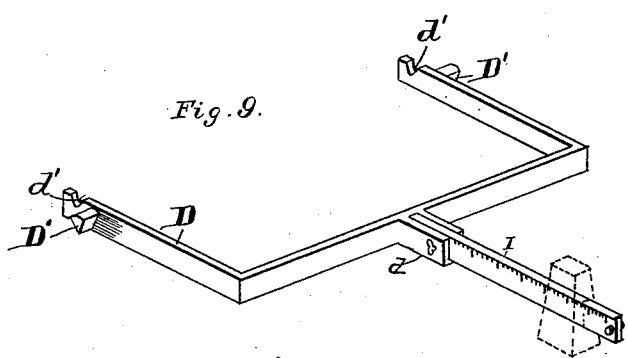
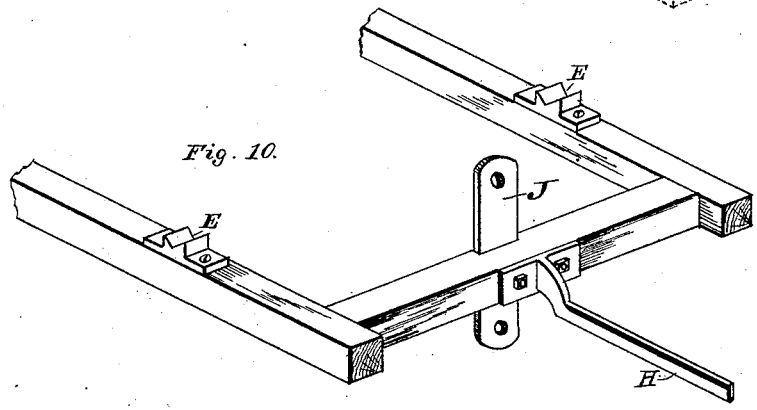
WITNESSES:
F. G. Fischer
L. A. Fischer
INVENTORS:
Valentin Weber
& James R. Harrison
By
their Attorney.

UNITED STATES PATENT OFFICE.

VALENTIN WEBER AND JAMES R. HARRISON, OF PRINCEVILLE, ILLINOIS.

AUTOMATIC GRAIN-WEIGHING MACHINE.

SPECIFICATION forming part of Letters Patent No. 359,525, dated March 15, 1887.

Application filed November 23, 1885. Serial No. 183,647. (No model.)

*To all whom it may concern:*

Be it known that we, VALENTIN WEBER and JAMES R. HARRISON, both of Princeville, in the county of Peoria and State of Illinois, have invented a new and useful Improvement in Automatic Weighing-Machines, which improvement is fully set forth in the following specification and accompanying drawings.

This invention is an improvement on our patent, No. 326,074, dated September 8, 1885, subject, "automatic weighing-machines;" and the object is to make a more excellent system of mechanism for the purpose of weighing grain.

The improvement consists of a train of mechanism for the purpose of more perfectly changing the stream of grain or other material to be weighed from a receptacle which is filled by any given weight to an empty one, and also in means whereby a filled receptacle is emptied of its contents, which are carried to either side of the machine for the purpose of facilitating the removal of the grain after being weighed.

In the drawings, Figure 1 is an isometric perspective view of the principal parts of the machine. Figs. 2, 3, 4, 5, and 6 are views of part of the mechanism for actuating the weighing apparatus, and Fig. 7 is a modification of the conveyer. Fig. 8 is a perspective view, in detail, of the levers operating the swinging table at the upper part of the hopper; Fig. 9, a perspective view, in detail, of the frame about the hopper carrying the scale-beam; Fig. 10, a like view of frame of the machine, showing the V-shaped bearings; Fig. 11, detail showing position of lever and pawl at the half-revolution.

A is part of the floor upon which the entire weighing apparatus stands.

B is an ordinary bucket and belt elevator for lifting grain to the top or the weighing-machine.

C is the weighing-hopper.

D is the scale-arm which incloses one-half of the hopper, and is provided at $d$ with a sleeve having a set-screw, into which sleeve the end of the scale-beam I fits, so that the graduated scale-beam I can be made longer or shorter for the purpose of balancing the hopper before the operation of the weighing begins.

At H is shown an iron bracket projecting out from the frame of the machine for a rest for the weight H' when it drops to the lowest point, and is for the purpose of preventing vibration.

At F on each side of the hopper is a V-shaped bearing. These rest in V-shaped slots $d'$ in the ends of the arms D, while the V-shaped bearings D' on said arms rest in the V-shaped sockets E on the upper side of the frame.

J is a vertical piece secured to the frame of the machine, to the top of which piece the swinging frame C' is journaled, it having a similar bearing at each end. K is a lever, pivoted at $K^2$ to the vertical piece J, for the double purpose of operating a slide at the bottom of the hopper C and for tilting the table C'. The lever K, which at its upper end is connected to a crank-arm on the journal of the table C', as shown in Fig. 8, is operated by means of the slotted pitman M and the crank N, which is secured to shaft O.

P is a sprocket-wheel, which continually revolves when the machine is in operation, and is arranged to give the shaft O an intermittent motion through mechanism and for a purpose hereinafter described.

R is a tripping-lever vibrating upon pin $c$. The inner end of the trip-lever R rests within a small opening, $c'$, in a block, $c^2$, attached to the outer face of the hopper, and is loose within this opening, so as to allow the movement of the lever as the hopper is raised and lowered.

S, Figs. 2, 3, and 5, is a double-ended pawl attached, by means of the screw $k'$, to a partial disk, T, which disk is firmly secured to a shaft, O, by means of a screw, $b$. (Plainly shown in Figs. 2 and 6.)

Under the machine is a long box, W, having a horizontal partition, $e$, to within a short distance of each end, as shown in Fig. 1 at right-hand end. Close to both ends of this partition are horizontal sprocket-wheels having journals $g$ at each end, which have bearings in the sides of the box W. The sprocket-wheel in the left end of the box (see Fig. 1) is provided with a beveled cog-wheel, $u'$, which engages with either of the small cogs $p$ and $p'$ of the reversing clutch-gear on the shaft $w$, which is operated by the lever $t$. Between the two sprocket-wheels in the ends of the box W is an endless chain belt provided with strips of wood $i$, which drag along on the top of the horizontal partition $e$, for the purpose of conveying grain, as will be described. The hopper C is vertically partitioned through its center, dividing it into two apartments, and with the swinging table C′ operates the same as similar parts in our invention, hereinbefore referred to.

The mechanical movement for giving an intermittent motion to the shaft O is perfect in its action, and can best be described by reference to Figs. 2, 3, 4, 5, and 6.

The sprocket-wheel P has firmly attached to it a ratchet-wheel, $r$, which forms a hub, as shown in Fig. 4. This sprocket-wheel, together with the ratchet-hub, are loosely fitted to the shaft O. The partial disk T is securely attached to the shaft by means of the set-screw $b$. Pivoted to the partial disk T is a pawl, S, having ends $j$ and $k$ and a point, $w'$, for catching in the teeth of the ratchet-hub of the sprocket-wheel P. In the recess $h$ of this partial disk T is the pin $z$, and on one limb of the pawl S is another pin, $y$, and secured at its ends on said pins is a spring, $q$. (Shown in dotted lines in Fig. 3.) A collar, $f$, is firmly secured to the shaft O, as shown in Fig. 1.

The operation is as follows: Power being applied to the shaft $u$, at the top of the elevator B, grain will be raised and pour out of the spout B′ upon the inclined swinging table C′, which causes it to slide off into one-half of the weighing-hopper C, and as the hopper will contain the number of pounds indicated by the scale-beam I, it causes the hopper to lower, carrying down with it the end of the trip-lever R, connected to the hopper, and thus raises the other end above and discharges it from the pawl S, the spring of which instantly throws it into the notches of the revolving ratchet, secured to the sprocket-wheel P, and causes the partial disk T, together with the shaft O and cranks N, to start in revolution. After the hopper C has discharged a small part of its grain into the conveyer-box W, it is lightened, and arises by the action of the scale-beam, weight, and lever, which causes the outer end of the pawl trip-lever R to instantly ascend. The shaft, now making its one-half revolution, carries one end of the pawl S around until it comes in contact with the end of the lever R, as shown in Fig. 1. This collision turns the pawl on the screw $k'$, and lifts it out of the notches of the ratchet, which is attached to the continually-revolving sprocket-wheel P. The sprocket-wheel, being geared to the elevator, continues its motion, running loosely on the shaft O. On each end of the shaft O is a crank, N, which is clamped in the slot $a$ in the end of each pitman M, moves the levers K on each side of the machine forward and back, and these levers, being connected to swinging table C′ at the top and to a valve, L, at the bottom, as in our former patent, hereinbefore referred to, it opens the valve L and discharges the grain which has been weighed, and changes the tilting table C′ to the empty side of the hopper to receive another draft of grain every time the shaft O makes one-half of a revolution. The grain in the weighing-hopper C is discharged into the horizontal conveyer W, by which it is conveyed to either side of the machine by the chain and blocks $i$, being operated either way by the reversing clutch-gear engaging with the beveled cog-wheel $p$ at the left end of the box. The reverse clutch-gearing is driven by a chain belt geared to the elevator-shaft $u$, as shown in Fig. 1.

A modification of the conveyer is shown in Fig. 7, in which we provide a hinged piece, $a'$, at each end, connected together by means of rod $b'$ in such a way that when one of them is closed up the other is turned down and operated by a lever, $c'$, attached to the said rod.

Having described our invention, what we claim is—

1. In an automatic weighing-machine, a train of mechanism for giving intermittent motion, consisting of a shaft having thereon a sprocket-wheel and laterally thereof a partial disk, T, whereby motion is communicated to the said shaft, and a double-ended pawl, S, for catching in the teeth of a ratchet-hub of the sprocket-wheel, and a spring, $q$, secured by means of pins and the trip-lever R, the said parts so disposed that one end of the spring will bear against the arm of the pawl and hold it in the teeth of the ratchet and at the same time cause it to engage with the end of the said trip-lever, so that when the hopper is lowered after being filled one end of the trip-lever connecting with the said hopper is raised above the pawl, the spring of which instantly throws it into the notches of the revolving ratchet, substantially as and for the purposes herein set forth and described.

2. The combination of the tilting table C′, journaled within the hopper C, the said hopper being provided outwardly with a trip-lever, R, so disposed as to engage with the double-ended pawl S, secured to the partial disk T, in connection with the sprocket-wheel, the shaft O, the cranks N, and pitmen M, having in one end the slots $a$, and at the other engaging with the levers K, so as to operate the tilting table C′ and valve L, substantially as herein set forth.

3. The combination of the hopper C, the tilting table C′, the scale-beam I, the weight H′, and bracket H, the levers K, and valve L, with the pitmen M, having slots $a$, cranks N, shaft O, sprocket-wheel P, double-ended pawl S, the partial disk T, and tripping-lever R, substantially as herein set forth and described.

4. The combination of the hopper C, tilting table C′, the valve L, the lever K, the pitman M, the shaft O, carrying thereon the partial disk T and the sprocket-wheel P, the spring-actuated double-ended pawl S, in connection with the tripping-lever R, with the conveyer-box W, provided therein with endless chains and conveyers for discharging the grain at either side of the machine, and so disposed as to be reversible by means of clutch-gearing $w$, the whole arranged as and for the purpose substantially as herein set forth and described.

In testimony that we claim the foregoing we have hereunto set our hands this 22d day of October, 1885, in the presence of witnesses.

VALENTIN WEBER.
JAMES R. HARRISON.

Witnesses:
JOSEPH D. BUSH,
FRANK A. WEBER.